(12) United States Patent  (10) Patent No.: US 8,528,598 B2
Morgan  (45) Date of Patent: Sep. 10, 2013

(54) FLOW SPLITTER

(75) Inventor: Daniel P. Morgan, Vacaville, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 610 days.

(21) Appl. No.: 12/669,891

(22) PCT Filed: Apr. 28, 2008

(86) PCT No.: PCT/US2008/061729
§ 371 (c)(1),
(2), (4) Date: Apr. 28, 2010

(87) PCT Pub. No.: WO2009/014783
PCT Pub. Date: Jan. 29, 2009

(65) Prior Publication Data
US 2010/0200071 A1  Aug. 12, 2010

Related U.S. Application Data

(60) Provisional application No. 60/950,883, filed on Jul. 20, 2007.

(51) Int. Cl.
*F16K 11/048* (2006.01)
(52) U.S. Cl.
USPC .................. 137/625.5; 137/869; 261/61.2
(58) Field of Classification Search
USPC ................. 137/625.5, 869; 251/61.2
See application file for complete search history.

(56) References Cited

U.S. PATENT DOCUMENTS

| | | | |
|---|---|---|---|
| 2,318,261 A | 5/1943 | St. Clair | |
| 2,578,042 A | 12/1951 | Chandler | |
| 2,710,620 A | 6/1955 | Watson | |
| 4,237,931 A * | 12/1980 | Rafaely | 137/625.5 |
| 4,923,092 A | 5/1990 | Kirschner | |
| 5,143,118 A * | 9/1992 | Sule | 137/554 |
| 5,546,987 A * | 8/1996 | Sule | 137/625.5 |
| 5,924,441 A * | 7/1999 | Leys et al. | 137/312 |
| 5,967,173 A * | 10/1999 | Kingsford et al. | 137/312 |
| 6,908,277 B2 * | 6/2005 | Jacobsson | 415/43 |
| 7,163,024 B2 * | 1/2007 | Igawa et al. | 137/486 |

FOREIGN PATENT DOCUMENTS

FR  2497689  7/1982

OTHER PUBLICATIONS

International Search Report for corresponding application No. PCT/US2008/061729 dated Oct. 9, 2009.

* cited by examiner

*Primary Examiner* — John Fox
(74) *Attorney, Agent, or Firm* — Renner, Otto, Boisselle & Sklar, LLP

(57) ABSTRACT

A flow splitter (10) that is uniquely characterized by the use of two diaphragm valves in a single valve body that are arranged in opposition to one another. The diaphragm valves are coupled together for common movement by a coupler, such that the flow rate through respective outlets is a function of the position of either diaphragm valve. That is, the position of one valve is a function of the position of the other valve, and vice versa. With this construction a single actuator can control the ratio of total flow that will be delivered to each of two outlet ports. Moreover, such construction eliminates the need for thermal or pressure sensors and thus the drawbacks associated therewith.

13 Claims, 3 Drawing Sheets

FLOW SPLITTER

This application is a national phase of International Application No. PCT/US2008/061729 filed Apr. 28, 2008 and published in the English language.

RELATED APPLICATIONS

This application claims the benefit of U.S. Provisional Application No. 60/950,883 filed Jul. 20, 2007, which is hereby incorporated herein by reference.

FIELD OF THE INVENTION

The present invention is directed to fluid processing systems, and more particularly to a system and method for dividing a single mass flow into a desired ratio of two or more flows. The invention has particular application to semiconductor processing equipment wherein precisely metered quantities of process gases are delivered to semiconductor process chambers.

BACKGROUND OF THE INVENTION

Fluid processing systems are used in the semiconductor and pharmaceutical industries (as well as in other industries) to provide a precise quantity of fluid or fluids to a processing chamber. For example, in the semiconductor industry, fluid processing systems may be used to provide precisely metered quantities of fluid or fluids to a semiconductor wafer processing chamber. In a typical fluid processing system, each of a plurality of fluid supplies are respectively coupled to a mass flow controller that is capable of providing a precisely metered amount of fluid to a common manifold. The common manifold is fluidly coupled to an inlet of the process chamber. Conventionally, the process chamber has only a single inlet to receive the flow of process fluids from the common manifold.

Sometimes dividing combined process gases equally among multiple process chambers, or among separate portions of a single process chamber, is desired. In such cases, a single outlet of the gas box may be connected to secondary flow paths. Existing flow splitters heretofore have relied on thermal or pressure sensors to measure the flow rate through each outlet channel. The output signal of these sensors is a function of the flow rate through each sensor; therefore these devices have a limited flow range. Different splitters are required to accurately split different inlet flow rates. In addition, thermal and pressure sensors drift over time, so that these devices need to be re-calibrated. Thermal or pressure sensor-based devices also require increased pressure drop to achieve a reasonable sensor signal. This increases the system pressure drop and slows the response of the gas delivery system. A sensor-based flow splitter using two control systems that will oscillate until equilibrium can be established. This can take up to ten seconds, which represents a significant delay in semiconductor processing.

SUMMARY OF THE INVENTION

The present invention provides a flow splitter that is uniquely characterized by the use of two diaphragm valves in a single valve body that are arranged in opposition to one another. The diaphragm valves are coupled together for common movement by a coupler, such that the flow rate through respective outlets is a function of the position of either diaphragm valve. That is, the position of one valve is a function of the position of the other valve, and vice versa. With this construction a single actuator can control the ratio of total flow that will be delivered to each of two outlet ports. Moreover, such construction eliminates the need for thermal or pressure sensors and thus the drawbacks associated therewith.

Accordingly, the invention provides a flow splitter comprising a valve body having an inlet, first and second outlets, and a common passage connected to the inlet and extending between oppositely facing first and second valve seats disposed between the common passage and the first and second outlets. First and second diaphragm valves respectively are movable toward and away from the first and second valve seats for modulating flow between the common passage and the first and second outlets. A coupler couples the first and second diaphragm valves for common movement.

The flow splitter may be further characterized by one or more of the following features:
- the diaphragm valves each include a diaphragm having a peripheral portion attached to the valve body and a central portion attached to the coupler.
- the central portion of the diaphragm of the first diaphragm valve is welded to the coupler.
- the central portion of the diaphragm of the second diaphragm valve is welded to the coupler.
- the central portion of the diaphragm of one of the diaphragm valves is attached to the coupler by a magnetic device.
- the diaphragm valves each include a valve member attached to the central portion thereof, the valve member being movable toward and away from the respective valve seat to control flow therethrough.
- each valve member includes a gain-increasing tapered portion extending through the valve seat.
- the valve members of the diaphragm valves are connected by a stem extending therebetween.
- at least one of the diaphragm valves is attached to the coupler with a snap connection.
- an actuator for moving the first and second diaphragm valves.
- a controller for controlling the actuator.
- the flow ratio is measured as a function of the position of either one of the diaphragm valves.

According to another aspect of the invention, a method for dividing a process flow in a flow splitter, comprises supplying a process flow from an inlet to a common passage that communicates with first and second outlets via first and second valve seats respectively disposed between the common passage and the first and second outlets; and modulating flow through the valve seats by using first and second diaphragm valves respectively movable toward and away from the first and second valve seats, which diaphragm valves are coupled together for common movement.

The method may be further characterized by one or more of the following features:
- the position of one diaphragm valve is controlled as a function of the position of the other diaphragm valve.
- the coupling of the diaphragm valves balances the atmospheric pressure load to allow the diaphragm valves to be actuated with a motor smaller than that needed to actuate a single diaphragm valve of identical construction.

Further features of the invention will become apparent from the following detailed description when considered in conjunction with the drawings.

DETAILED DESCRIPTION

Figure 1:
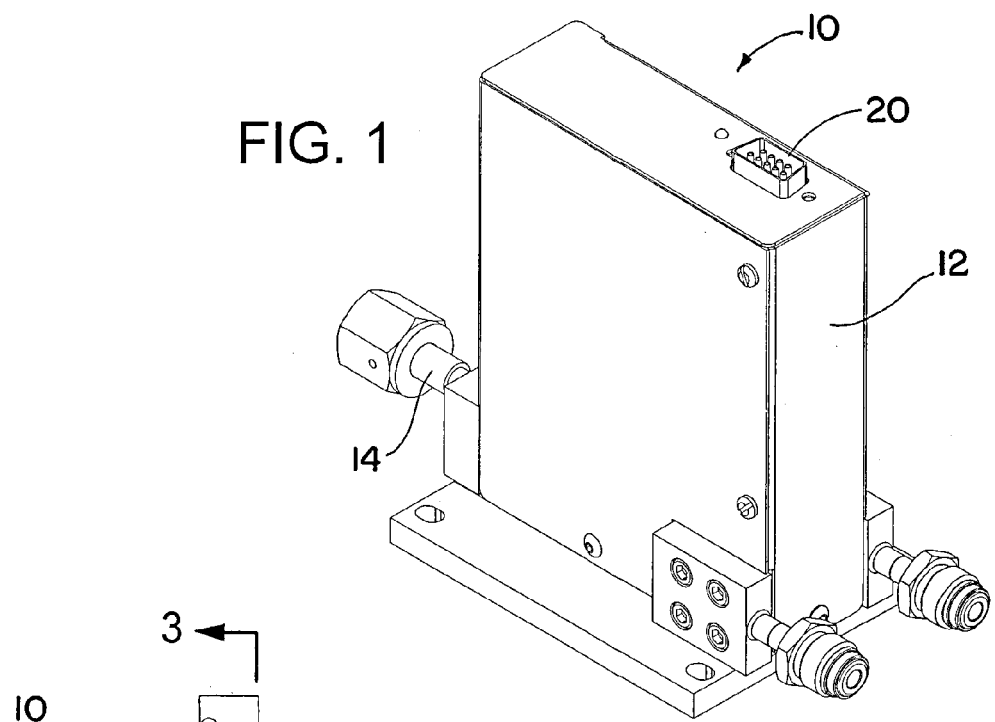
FIG. 1 is a perspective view of an exemplary flow splitter according to the invention.

Referring now to the drawings in detail and initially to FIG. 1, an exemplary flow splitter according to the invention is indicated generally by reference numeral 10. The flow splitter 10 can be seen to include a housing 12 having an inlet 14 and a pair of outlets 16 and 18. The housing further has an electrical connector 20 for conveniently effecting connection of electronics contained within the housing to external components, as in a conventional manner. The inlet and outlets may each have associated therewith a suitable fitting as shown.

Figure 2:
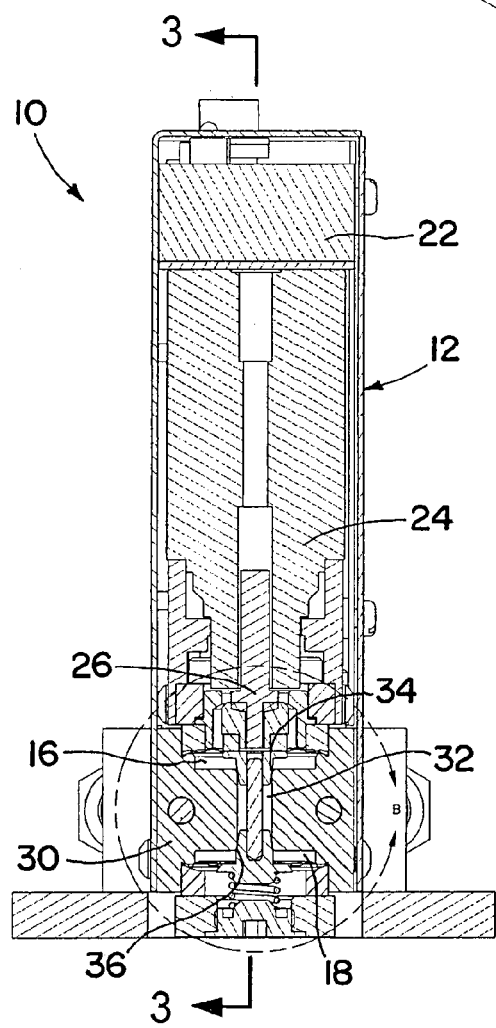
FIG. 2 is a cross-sectional view of the flow splitter.

Referring now to FIG. 2, the upper portion of the housing 10 may contain the valve splitter electronics 22, such as a motor controller, for controlling a motor 24 having an output shaft or other member 26. The lower end of the housing contains or forms a valve body 30 that has a common passage 32 connected to the inlet 14 and extending between oppositely facing valve seats 34 and 36 disposed between the common passage and the outlets 16 and 18, respectively. A pair of diaphragm valves 40 and 42 are assembled to the valve body for movement toward and away from the respective valve seats 34 and 36 for modulating flow between the common passage 32 and the outlets 16 and 18.

In accordance with the invention, the diaphragm valves 40 and 42 are joined together for common movement by a coupler 46. Consequently, the flow ratios at the outlets 16 and 18 will be a function of the position of either diaphragm valve. That is, the position of either diaphragm valve can be detected without the need for a sensor in the gas area of the splitter, which is particularly beneficial when the flow splitter is used to control the delivery of toxic and corrosive gas mixtures. Moreover, the flow ratio will be independent of flow rate, which is an advantage over prior art flow splitters that rely on thermal sensors in the gas stream. Another attainable advantage is the elimination of sensor drift, which is another inherent limitation of prior art flow splitters that rely on thermal or pressure sensors in the gas stream. This eliminates the need to recalibrate the flow splitter in the field.

Another advantage of coupled diaphragm valve configuration is that desired flow rates can be obtained with lower pressure drop. This is a significant advantage in a vacuum system and will result in faster flow stabilization time, resulting in increased throughput, and/or faster purge time, also providing increased throughput.

With the foregoing coupled diaphragm arrangement, flow through each channel need not be measured. The flow ratio can be characterized by measuring the position of the diaphragm of only one of the valves. The ratio of flow being delivered to one of the outlets can be fit with a third order polynomial of the form:

$$y=a+bx+cx^2+dx^3$$

where "y"=the ratio of total flow being delivered to one outlet, commonly referred to as a channel, say channel A, and "x"=the position of diaphragm associated with channel A. Flow through the other outlet, channel B, can be represented by the following equation:

Channel $B$ flow ratio is=100−Channel $A$ flow ratio

This relationship will usually hold for any total flow rate. Accordingly, only one model is required for any flow rate system.

Figure 3:
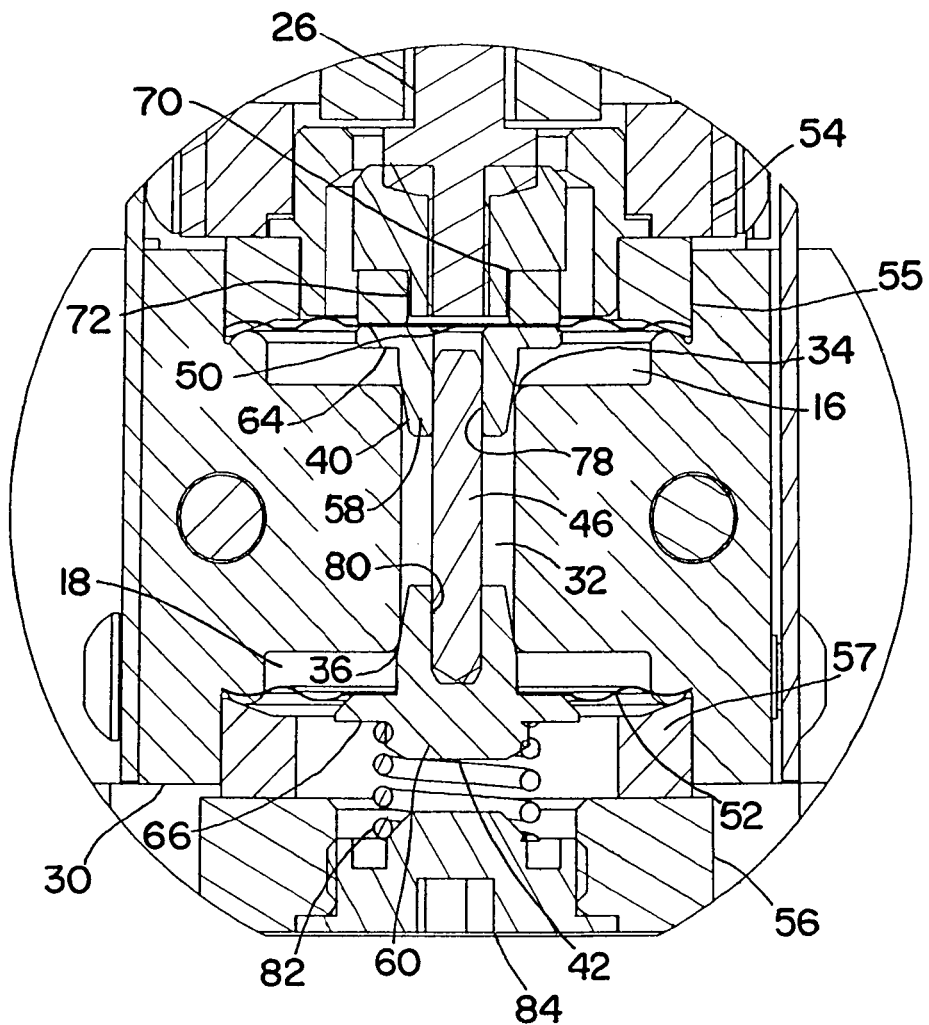
FIG. 3 is a cross-sectional view of the flow splitter, taken along the line 3-3 of FIG. 2.

As best seen in FIG. 3, each diaphragm valve 40, 42 includes a diaphragm 50, 52 having a peripheral portion attached to the valve body 30, for example by a clamp plate 54, 56 via backup rings 55, 57, and a central portion to which a valve member 58, 60 is attached. In the illustrated embodiment, the valve members 58 and 60, as opposed to the diaphragm itself, interact with the valve seats 34 and 36 to control flow from the inlet 14 to the outlets 16 and 18. It will be appreciated, however, that the central portion of the diaphragm may perform the function of the valve members 58 and 60 by moving into and out of engagement with the valve seats. That is, the valve members of the diaphragm valve may be unitary with the diaphragm.

In the illustrated embodiment, the valve members 58 and 60 are identical and oppositely oriented such that tapered ends thereof protrude through the valve seats. As will be appreciated, the degree of taper will control the gain of the valves. In addition, the valve seat surface that is engaged by the valve members, may be rounded as shown. The foregoing can provide for precise control of low flow gaseous media.

The central portion of each diaphragm 50, 52 of one or both diaphragm valves 40, 42 may be welded to the respective valve member 58, 60. To this end, the diaphragms may be thin metal diaphragms suitable for such a welded connection, and each valve member 58, 60 may have an annular flange 64, 66 to which the metal diaphragm is welded. In an alternative embodiment, the central portion of one or both of the diaphragms may be held to the valve member 58, 60 by a clamp member that is magnetically attracted to the valve member. For instance, the member 70, which happens to be a magnetic component, may be magnetically attracted to the valve member 58 to hold the diaphragm clamped therebetween. Consequently, the valve member will need to be magnetically attracted to the magnetic member 70, or vice versa. Thus, the valve member or both valve members may be made, for example, of a stainless steel with adequate iron content to support a magnetic field.

Preferably, both valve members are welded to their respective diaphragms for increased stability. The magnetic member is provided in the illustrated splitter to provide for connection of the valve member 58 to an adapter 72 coupled to the output shaft 26 of the motor 24. The motor 24 may be a double stack stepper motor that controls position of the coupled interdrive within 0.00006 inches.

As above mentioned, the valve members 58 and 60 are connected together for common movement by the coupler 46. In the illustrated embodiment, the coupler 46 is a separate piece, such as a stem, that has opposite ends to which the valve members 58 and 60 are attached by suitable means. As shown, the ends of the coupler may be press-fit, snap-fit, bonded or otherwise secured in central holes 78 and 80 in the valve members. It will be appreciated that other configurations may be used, as well. For instance, the coupler may be unitary with one or both of the valve members. In an embodiment where the diaphragm itself interacts with the valve seat, the diaphragm may be directly connected to respective ends of the coupler, as in the same manner described above with respect to the valve members.

If desired, an anti-backlash spring 82 may be provided. As shown, the spring 82 may be a typical helical spring interposed between the valve member 60 and a spring plug 84. One attribute of helical springs is that they do not produce a perfectly axial force, that is, they will provide an asymmetric load on the surface they act upon, the result being that the valve members would be driven off of their centerline. Since the diaphragm valves, specifically the valve members, are coupled, it is the opposing nozzle valve that will be driven the furthest off center. The lateral shifting force, however, will be resisted by the other diaphragm, thus overcoming the lateral forces of the spring. At those skilled in the art, at very low flow rates used in semiconductor processes, a lateral shift of only 0.002 inches could result in a significant calibration error.

The extreme level of precision and repeatability required to control the gas split ratio to within 1% precludes the use of sliding seals that would add friction and ultimately hysteresis to the positioning of the valve nozzles. In the configuration shown, the inlet is common to both nozzles and no sliding seals are associated with the diaphragm valves and/or coupler. Moreover, the coupler (coupling member) does not have to be sealed to the valve body. No sliding seals need be required anywhere in the flow splitter.

The opposing diaphragm design also reduces the load required to actuate the valves. A typical diaphragm valve must have adequate diaphragm rigidity and initial bias force to insure that the diaphragm does not deflect due to atmospheric pressure when the valve interior is evacuated. The valve actuator must then overcome this bias load to adjust the position of the diaphragm. The coupled diaphragm approach of the invention balances the atmospheric pressure load to allow the device to operate with a motor much smaller than the motor needed to actuate a single diaphragm valve.

Figure 4:
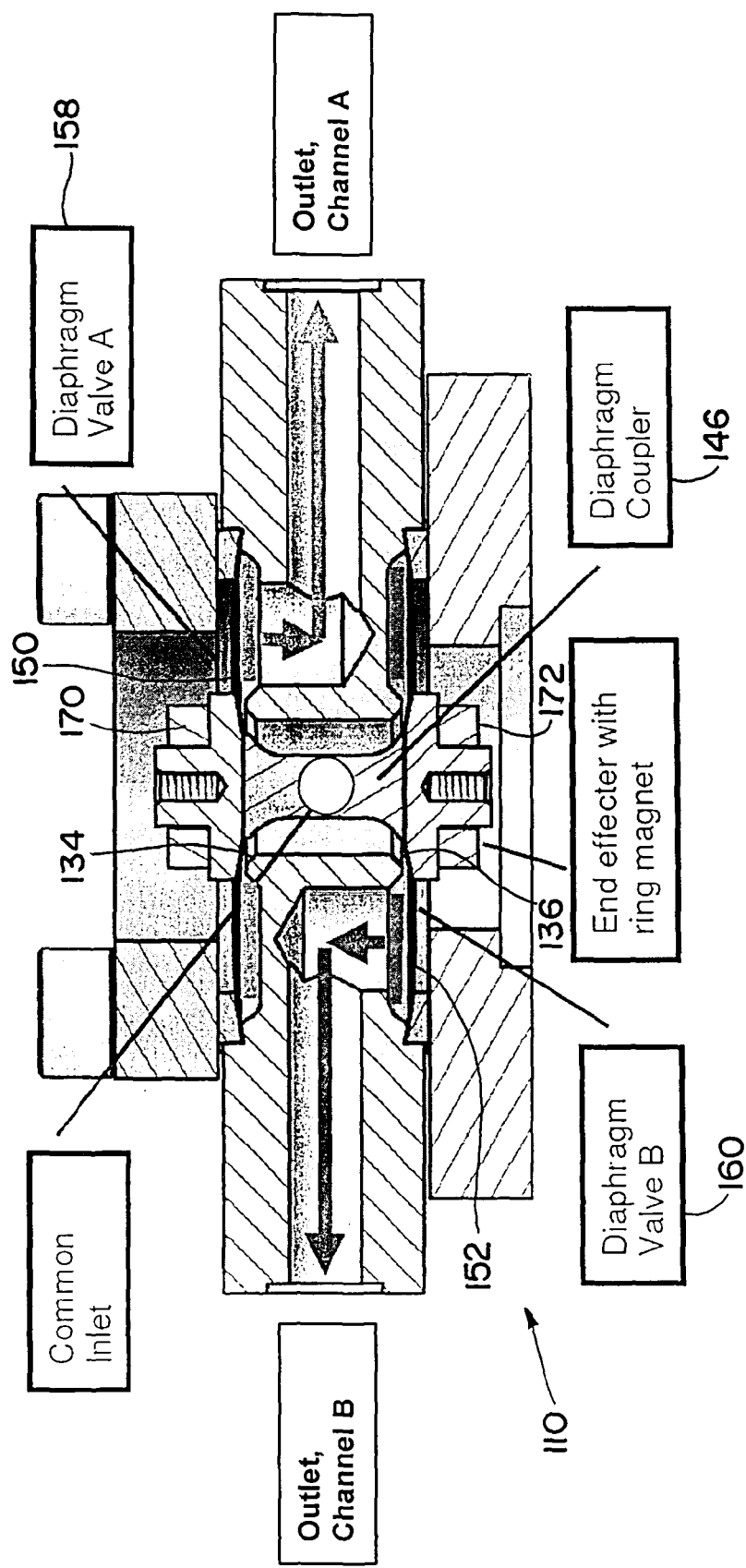
FIG. 4 is a cross-sectional view of another embodiment according to the invention.

Turning now to FIG. 4, another exemplary flow splitter according to the invention is indicated at 110. In the flow splitter 110, the diaphragm 150, 152 of each diaphragm valve 158, 160 cooperates with adjacent tapered portions of the coupling member 146 to control flow through the respective valve seat 134, 136 through interaction with the valve seat. In addition, one or both of the diaphragms may be clamped to respective ends of the coupling member by magnetic clamping members 170, 172. Again, the diaphragm valves are coupled together for common movement for controlling the division of flow from the inlet to the outlets.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flow sputter comprising a valve body having an inlet, first and second outlets, and a common passage connected to the inlet and extending between oppositely facing first and second valve seats disposed between the common passage and the first and second outlets, first and second diaphragm valves respectively movable toward and away from the first and second valve seats for modulating flow between the common passage and the first and second outlets, and a coupler coupling the first and second diaphragm valves for common movement, wherein the diaphragm valves each include a diaphragm having a peripheral portion attached to the valve body and a central portion attached to the coupler, and wherein the central portion of the diaphragm of one of the diaphragm valves is attached to the coupler by a magnetic device.

2. A flow splitter according to claim 1, wherein the central portion of the diaphragm of one of the diaphragm valves is welded to the coupler.

3. A flow splitter according to claim 1, wherein the diaphragm valves each include a valve member attached to or unitary with the central portion thereof, the valve member being movable toward and away from the respective valve seat to control flow therethrough.

4. A flow splitter according to claim 3, wherein the valve members of the diaphragm valves are connected by a stem extending therebetween.

5. A flow splitter according to claim 1, wherein each valve member includes a gain-increasing tapered portion extending through the valve seat.

6. A flow splitter according to claim 1, wherein at least one of the diaphragm valves is attached to the coupler with a snap connection.

7. A flow splitter according to claim 1, comprising an actuator for moving the first and second diaphragm valves.

8. A flow splitter according to claim 7, comprising a controller for controlling the actuator.

9. A flow splitter according to claim 1, wherein the flow ratio is measured as a function of the position of either one of the diaphragm valves.

10. A flow splitter according to claim 1, wherein no sliding seals are associated with the diaphragm valves and/or the coupler coupling the diaphragm valves.

11. A flow splitter according to claim 1, wherein the coupler is not sealed to the valve body.

12. A flow sputter according to claim 1, wherein the diaphragm of each diaphragm valve is made of metal.

13. A flow splitter according to claim 1, wherein the flow splitter is used in a semiconductor processing system to supply flow of processing fluids to processing chambers.

* * * * *

UNITED STATES PATENT AND TRADEMARK OFFICE
CERTIFICATE OF CORRECTION

PATENT NO.        : 8,528,598 B2                                        Page 1 of 1
APPLICATION NO. : 12/669891
DATED             : September 10, 2013
INVENTOR(S)       : Daniel P. Morgan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Fifteenth Day of September, 2015

Michelle K. Lee
*Director of the United States Patent and Trademark Office*